United States Patent [19]
Shinjo

[11] Patent Number: 5,775,478
[45] Date of Patent: Jul. 7, 1998

[54] POSITION REGULATING PARTS FEEDER

[75] Inventor: Hiroshi Shinjo, Osaka, Japan

[73] Assignee: Yugenkaisha Shinjo Seisakusho, Osaka, Japan

[21] Appl. No.: 734,085

[22] Filed: Oct. 21, 1996

[30] Foreign Application Priority Data

Oct. 24, 1995 [JP] Japan ................................. 7-298902

[51] Int. Cl.$^6$ ................................................. B65G 47/24
[52] U.S. Cl. ....................... 198/389; 198/396; 193/25 FT
[58] Field of Search ................................ 198/383, 389, 198/394, 396, 398; 193/2 R, 25 FT

[56] References Cited

U.S. PATENT DOCUMENTS 3,956,812  5/1976  Kawakami et al. ............ 193/25 FT X
4,281,758  8/1981  Adamski et al. ...................... 198/398
4,884,678  12/1989 Graham et al. .................... 198/398 X

FOREIGN PATENT DOCUMENTS 52-11331  3/1977  Japan .

*Primary Examiner*—James R. Bidwell
*Attorney, Agent, or Firm*—Antonelli, Terry, Stout & Kraus, LLP

[57] ABSTRACT

A position regulating parts feeder has a rotary hopper (11) and a slanted chute (20) fixed in the hopper that has lift plates (12) secured to its inner periphery. The chute is composed of an upstream receiving section (21), a middle sorting section (22) and a downstream discharging section (23). A groove (51) formed in the upstream section has an open top and is of a depth enough to wholly embrace each of the parts (1) lying on its side such that its front and rear faces are oriented sideways. The side walls have upper oblique zones (31c) and (41c) to widen the groove towards its top. A path defined in the middle section and continuing from the groove is composed of a main passageway (53) extending to the downstream section for transfer of the regularly positioned parts, and an auxiliary passageway (54) branching off from the main one for transfer of the inverse parts to an outlet (35) formed in a bottom of the chute.

3 Claims, 7 Drawing Sheets

5,775,478

POSITION REGULATING PARTS FEEDER

BACKGROUND OF THE INVENTION

1. Field of the Invention

The present invention relates to a position regulating parts feeder for arranging all the parts in the same direction and then feeding them to an adjacent automatic assembling apparatus. The parts may for example be the so-called self-piercing nuts each having a pilot protrusion formed coaxially with a central female-threaded bore.

2. Description of the Prior Art

The prior art feeders of this type having long been used comprise each a rotary hopper and a slanted delivery chute placed therein. The hopper has lift plates secured to its inner periphery, as disclosed in Japanese Utility Model Publication Sho. 52-11331. This feeder for use with the self-piercing nuts comprises a special delivery chute that has an upwardly opened longitudinal guide groove. This groove will engage with the nuts, if their pilot protrusions face a groove bottom when they fall onto the chute. Some nuts regularly oriented to have their threaded bores positioned upright will thus be sorted from the other ones taking an inverted or irregular position, before delivery to a downstream equipment.

It has been necessary for the delivery chute in the prior art apparatuses to be made sharper or gentler as to its inclination, when adjusting its parts feeding capacity. In the event that the descend of the chute had to be made sharper to raise the feed rate, the probability for the falling nuts to be caught and sorted by said chute rather tended to decrease. Some of those nuts which have fitted in the guide groove were likely to jump and slip off such a sharp drop (i.e., delivery chute). In addition, collision of the succeeding nuts with said chute have used to impart a strong shock to the preceding nuts sliding therein. Since the preceding nuts have been allowed to engage with the chute only at their pilot protrusions, they have often been caused to spring out from the chute. Therefore, it has been difficult to raise the effective capacity simply by increasing the inclination of said delivery chute.

In some cases the slope has to be made gentler to an angle of about 20 degrees or less. Oil or grease and fine dusts sticking to the nuts have often hindered them from smoothly sliding. Thus, the chute must be vibrated or a compressed air must blow the nuts to force them forwards along said chute.

SUMMARY OF THE INVENTION

An object of the present invention is therefore to provide a position regulating parts feeder that is capable of operating without any auxiliary means or devices, to efficiently transport those parts such as the self-piercing nuts while arranging them in the same direction with respect to their front and rear faces.

According to the present invention, a position regulating parts feeder comprises a rotary hopper and a slanted chute fixed therein, with the hopper having secured to its inner periphery a plurality of lift plates, wherein the chute is composed of an upstream receiving section for catching the parts falling onto the chute, a middle sorting section for mechanically distinguishing a front face from a rear face of each of the parts so as to separate the parts standing in a regular direction from the other parts standing in an inverse direction, and a downstream discharging section for transferring only the parts standing in the regular direction. The upstream section has formed therein a longitudinal groove that has a widely open top and is of a depth enough to wholly embrace each of the parts lying on its side such that its front and rear faces do confront generally-upright side walls of the longitudinal groove. These side walls have upper oblique zones to widen the groove towards its top so as to smoothly receive the parts. A path is defined in the middle sorting section, which path continues from the longitudinal groove and is composed of a main passageway for the regularly positioned parts only and an auxiliary passageway for the inverse parts only. The main passageway extends to the downstream discharging section, with the auxiliary passageway branching off from the main passageway and extending to an outlet opening formed in a bottom of the slanted chute.

Preferably, a main body and a lid secured thereto constitute the slanted chute. The path defined in the sorting section disposed in the hopper has its top closed, preferably with a cover and a leaf spring as detailed below.

DETAILED DESCRIPTION OF THE PREFERRED EMBODIMENTS

Figure 1:
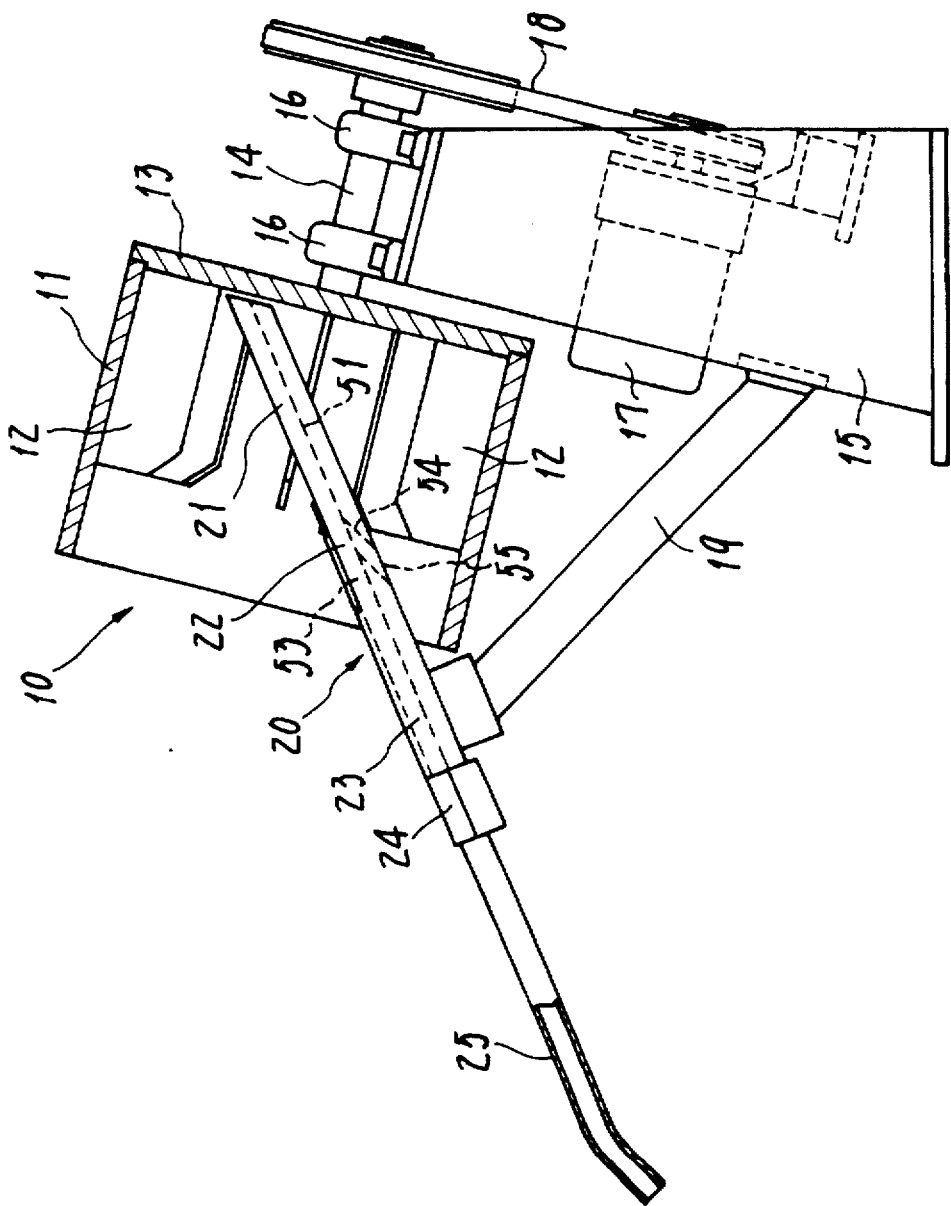
FIG. 1 is a front elevation of a position regulating parts feeder provided in an embodiment and shown partly in cross section.

A position regulating parts feeder provided herein and exemplarily adapted for the sorting feed of the self-piercing nuts will now be described in detail referring to the drawings.

Figure 9:
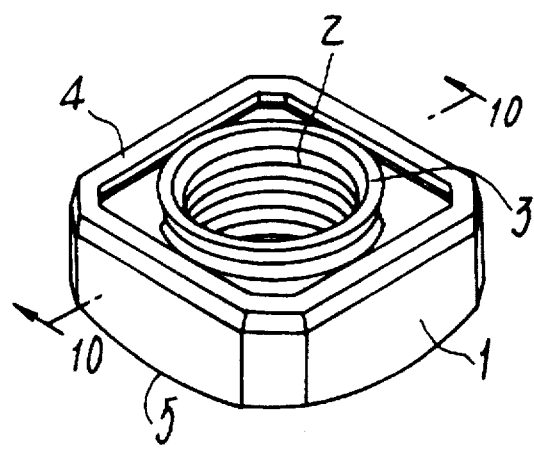
FIG. 9 is a perspective view of one of the self-piercing nuts that are to be regulated in their position while being transferred to a downstream apparatus.
Figure 10:
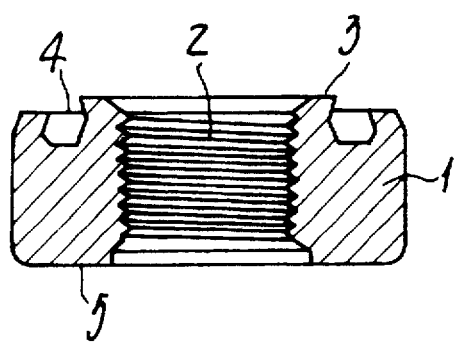
FIG. 10 is a cross section taken along the line 10—10 in FIG. 9.

As will be seen in FIGS. 9 and 10, each of the self-piercing nuts 1 has on its front face 4 a pilot protrusion 3. This protrusion integral with the nut is formed coaxially with a central threaded bore 2. The nut has a plane rear face 5.

FIG. 1 shows the parts feeder 10 which comprises a rotary hopper 11 and a slanted chute 20 fixed therein and standing still. A plurality of lift plates 12 are secured to an inner periphery of the rotary hopper.

The hopper 11 has a bottom 13 whose outer central portion is fixedly secured to a rotary shaft 14, which is supported by bearings 16 on a base 15. The rotary shaft is inclined such that an end of said hopper opens sideways and upwardly. A geared motor 17 mounted on the base 15 drives the rotary hopper at a constant speed, by means of a belt 18. As the hopper rotates, the lift plates 12 integral therewith will continue to take up a number of the self-piercing nuts 1 so that they subsequently fall towards the slanted chute 20.

The slanted chute 20 is composed of an upper and upstream receiving section 21 for catching the falling parts, a middle sorting section 22 for separating the parts standing in a regular direction in said chute from the other parts standing in an inverse direction, and a lower and downstream discharging section 23 for transferring only the parts standing in the regular direction. The discharging section 23 is supported rigidly by a bracket 19 having a foot fixed to the base 15. The receiving section 21 and the sorting section 22 are thus disposed in the hopper 11 at an angle of about 25 degrees, with the latter section continuing and descending from the former. A delivery hose 25 is connected by a joint 24 to a lower end of the discharging section 23.

Figure 2:
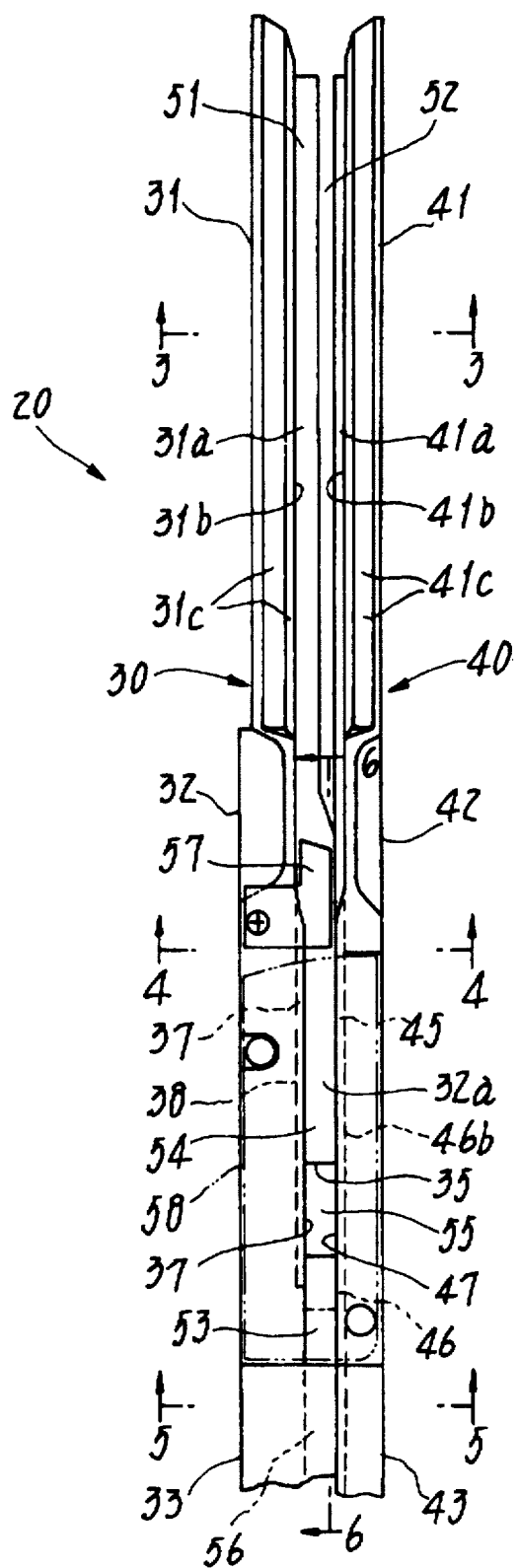
FIG. 2 is a plan view of a slanted chute incorporated in the parts feeder shown in FIG. 1.
Figure 3:
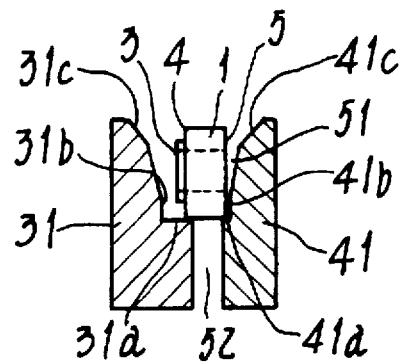
FIG. 3 is a cross section taken along the line 3—3 in FIG. 2.
Figure 4:
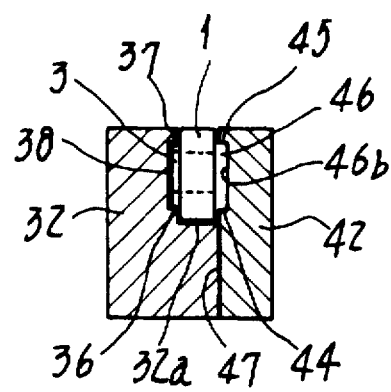
FIG. 4 is also a cross section taken along the line 4—4 in FIG. 2.
Figure 5:
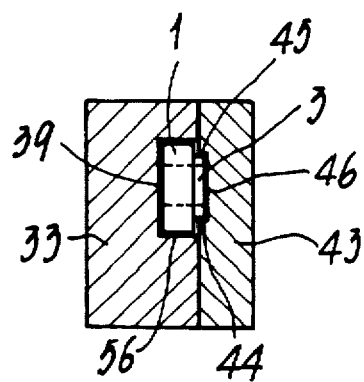
FIG. 5 is another cross section taken along the line 5—5 in FIG. 2.
Figure 7:
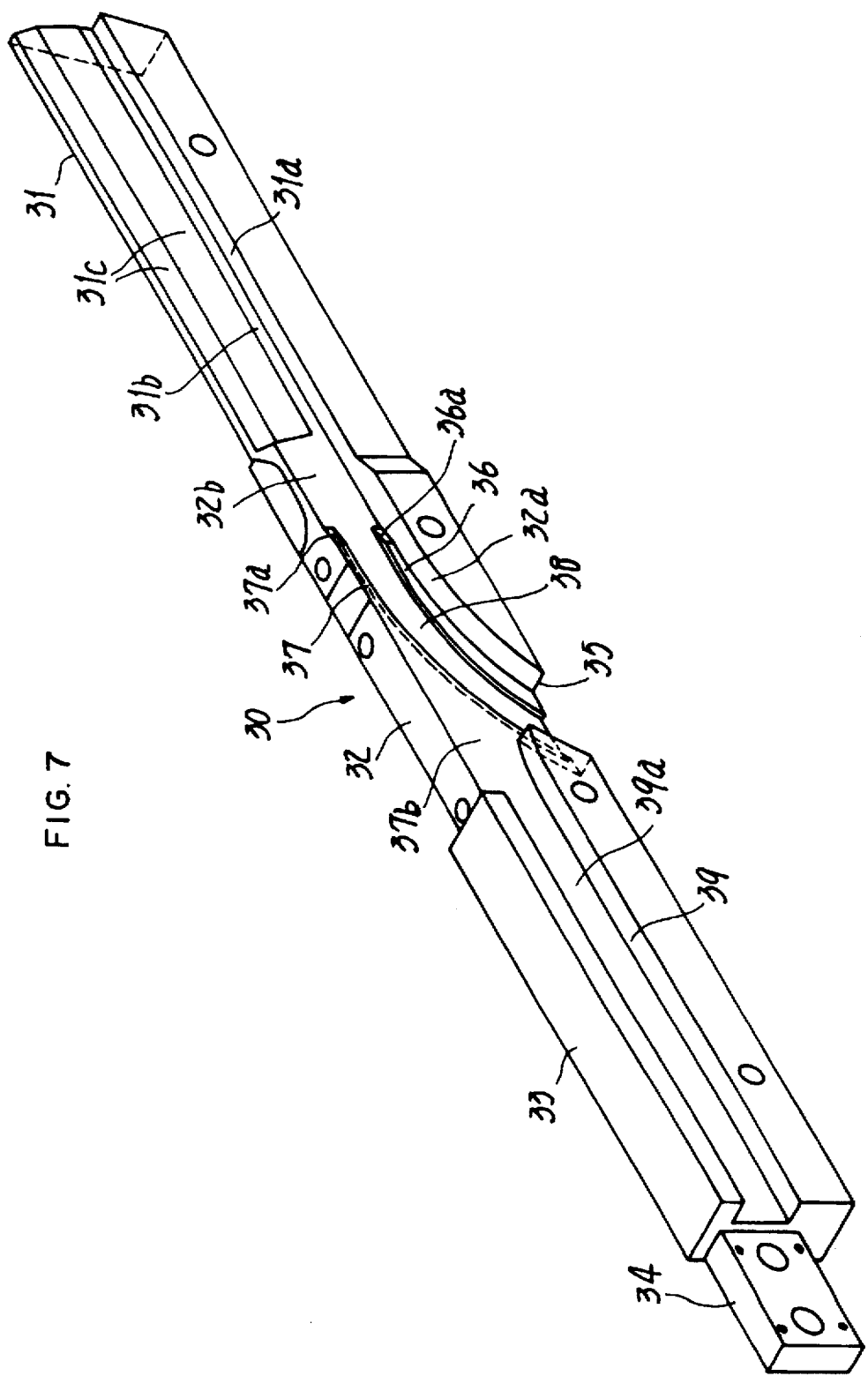
FIG. 7 is a perspective view of a main body of the slanted chute.
Figure 8:
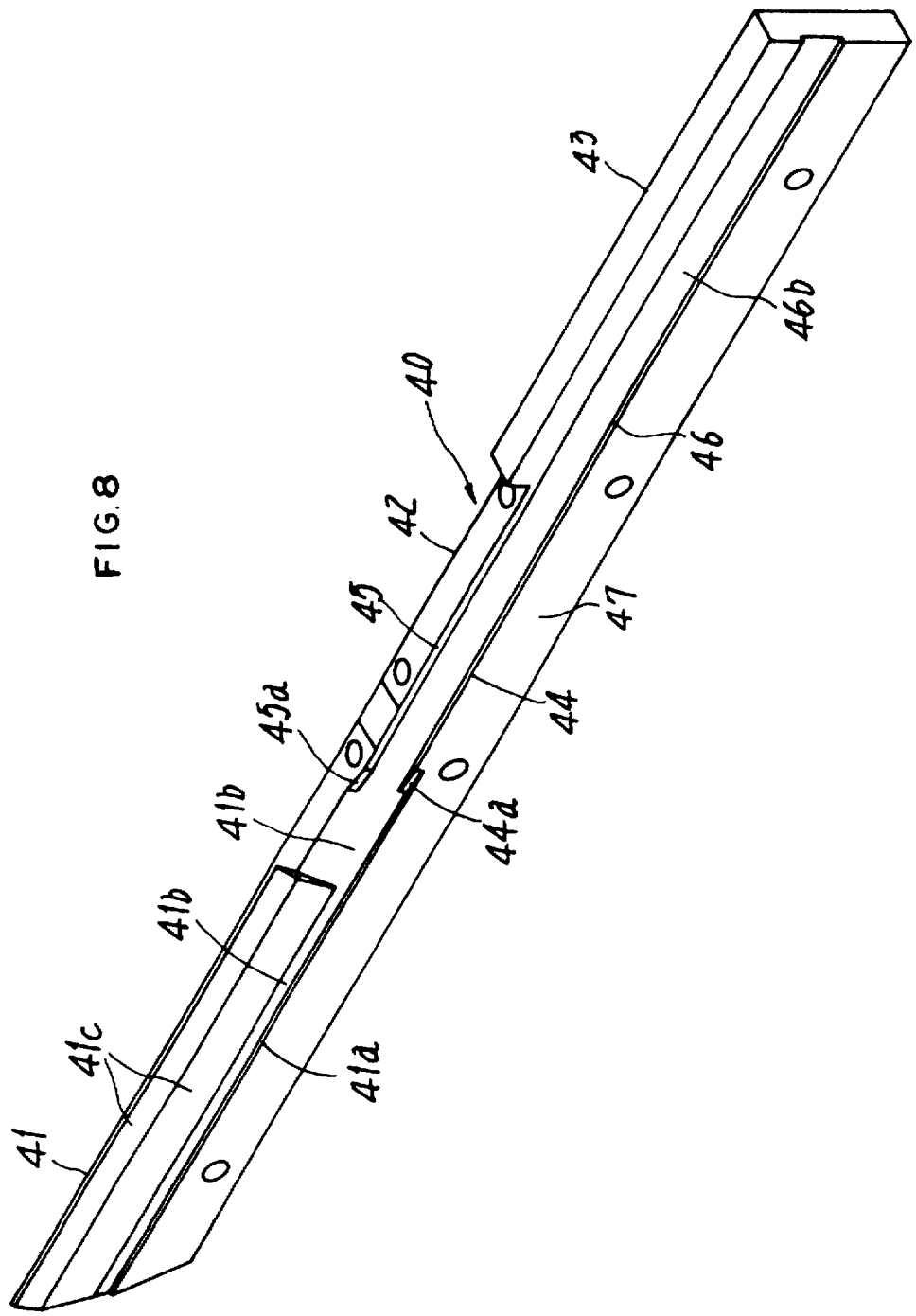
FIG. 8 is a perspective view of a lid attached to the main body so as to constitute the slanted chute.

The slanted chute 20 consists of a pair of elongate plates facing one another and secured to each other, as shown in FIGS. 2, 7 and 8. One of those plates is a main body 30, with the other being a lid 40. Both the main body and lid have their inner sides of a specially designed configuration.

As best seen in FIG. 7, the main body 30 consists of a stepped ledge 31 serving as one side wall of the receiving section 21, a middle portion 32 defining a branched passageway (detailed below) in the sorting section 22, and a rear portion 33 defining a channel in the discharging section 23. A bracket 34 to which a joint 24 is to be fixed extends rearwardly from the rear portion 33. The ledge 31 has a narrow plane bottom 31a, a low upright wall 31b continuing from an outer edge of the bottom, and an upper oblique zone 31c continuing from an upper edge of the low wall. The oblique zone 31c is bent outwardly towards its top so as to guide the self-piercing nut towards a center line of the receiving section. The middle portion 32 has also a bottom 32a broader than the bottom 31a of the ledge, and a higher upright wall 32b continuing from the upright wall 31b of the ledge. The bottom 32a of the middle portion is curved towards a lower face thereof and continues to a cutout 35 formed in said lower face. A first shoulder 36 inwardly protuberant from the upright wall 32b of the middle portion does extend along the bottom 32a. A second shoulder 37 also protuberant from said wall 32b extends in parallel with the first one 36 and leads to the cutout 35. A curved guide groove 38 thus defined between the shoulders 36 and 37 is of such a dimension and shape that the pilot protrusion 3 of self-piercing nut 1 can smoothly slide rearward and downward. Upstream ends of those shoulders 36 and 37 are chamfered at 36a and 37a so as to converge with the upright wall 32b. A rear side wall portion 37b extending upwardly through the shoulder 37 and to the chamfered end 37a thereof lies in parallel with the upright wall 32b of this middle portion 32. A groove 39 of a rectangular cross section formed in and longitudinally of the discharging section 23 is of such a dimension and shape that the body of self-piercing nut 1 can slide rearward and downward. A side wall 39a of this groove 39 serving as the channel mentioned above and the wall portion 37b of the sorting section are included in the same and one plane.

As best seen in FIG. 8, the lid 40 covering the main body of the slanted chute does consist of a stepped ledge 41 serving as the other side wall of the receiving section 21, a middle portion 42 defining the branched passageway (detailed below) in the sorting section 22, and a rear portion 43 defining the channel (detailed below) in the discharging section 23. Similarly to the ledge in the main body 30, this ledge 41 of the lid also has a narrow plane bottom 41a, a low upright wall 41b continuing from an outer edge of the bottom, and an upper oblique zone 41c continuing from an upper edge of the low wall. Also, the oblique zone 41c is bent outwardly towards its top so as to guide the self-piercing nut towards a center line of the receiving section. The bottom 41a in the lid is much narrower than that 31a in the main body 30. A third shoulder 44 and a fourth shoulder 45 lying in parallel with each other do extend from a forward end of the middle portion 42 to a rearward end of the rear portion 43. A shallow groove 46 defined between these shoulders 44 and 45 is of such a dimension and shape that the pilot protrusion 3 of the self-piercing nut 1 can smoothly slide rearward and downward. A side wall 46b of this groove 46 serving as the channel mentioned above and the upright wall 41b of the sorting section are included in the same and one plane. Upstream ends of the shoulders 44 and 45 are also chamfered at 44a and 45a so as to converge with the upright wall 41b.

The lid 40 is coupled with and fixed to the main body 30, using bolts or the like not shown, so as to form the slanted chute 2 as shown in FIG. 2. The ledges 31 and 41 face one another to provide the receiving section 21. The longitudinal groove 51 thus formed between those ledges has a widely open top. This groove 51 is of a depth enough to embrace each nut 1 in its entirety, which nut is lying on its lateral side such that its front face 4 (having the pilot 3 protruding therefrom) and its plane rear face 5 do confront the generally-upright side walls of this groove. A gap 52 intervening between the plane bottoms 31a and 41a will be effective to remove any foreign matters such as chips adhering to the nuts.

A path for the self-piercing nuts 1 is defined in between the middle portions 32 and 42 in the sorting section 22. This path is composed of a main passageway 53 for the regularly positioned nuts (whose pilot protrusions 3 are visible in FIG. 6) and a branched auxiliary passageway 54 for the inverse nuts 1' (whose pilot protrusions are shown with broken lines in FIG. 6). In detail, the main passageway 53 is defined by and between the side wall portion 37b extending from the second shoulder 37 of main body 30 and the shallow groove 46 of lid. The main passageway 53 is of the same cross-sectional shape as the channel 56 described below. On the other hand, the branched passageway 54 is defined by and between the curved guide groove 38 continuing from bottom 32a of the main body 30 and a side wall 47 (see FIG. 8) continuing to the side wall 46b of lid. Such a branched passageway 54 extends to and communicate with an outlet 55 (see FIG. 2) which is defined between the cutout 35 and a lower end of the side wall 47. The groove 39 in main body rear portion 33 faces the shallow groove 46 in lid rear portion 43 define therebetween the channel 56 in the discharging section. The reference numeral 57 in FIG. 2 denotes a leaf spring for forcibly regulating the position of nuts in a vertical plane, and a further numeral 58 denotes a cover openable to inspect the interior of the sorting section.

Figure 6:
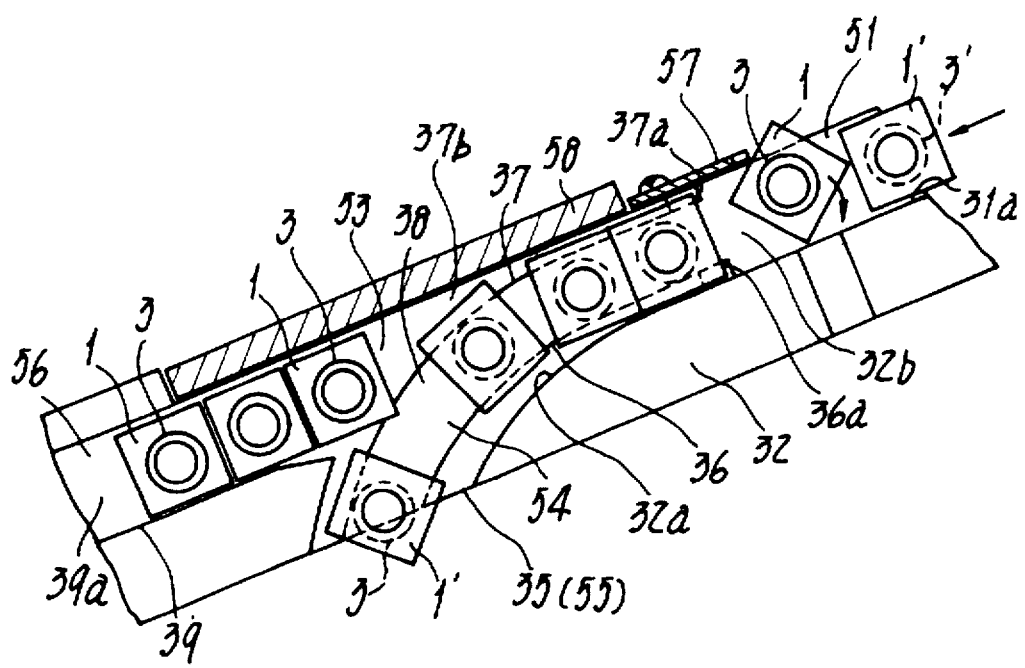
FIG. 6 is still another cross section taken along the line 6—6 in FIG. 2.

In operation of the apparatus detailed above, the rotary hopper 11 will be loaded with a number of self-piercing nuts 1. The lift plates 12 will raise them to subsequently drop onto the slanted chute 20, as the hopper is driven to rotate. The upper oblique zones 31c and 41c will thus guide the falling nuts towards the center line of longitudinal groove 51 formed in the receiving section 21, whether each nut is oriented regular or inverse. The self-piercing nuts thus received in the groove 51 and having their fronts 4 and rears 5 disposed sideways will then slide on the slanted bottoms 31a and 41a in the groove 51, downward towards the sorting section 22 due to the gravitational force. Since all the nuts 1 are embraced almost in their entireties in said groove, they are protected from being bumped off by any successively dropping nuts. Even if the inclination of slanted chute 20 is increased beyond the angle of 25 degrees, those nuts 1 will never slip off said chute while moving therealong, thanks to the size of said groove 51 wholly embracing each nut. Therefore, those nuts can be delivered to the sorting section 22 at any high speed. If any nut 1 received in the groove 51 is in an unstable position, it will be corrected by the leaf spring 57 as seen in FIG. 6 while moving towards the sorting section. At this sorting section 22, only those nuts whose pilot protrusions 3 are visible in FIG. 6 will be allowed to pass through the main passageway 53 and transfer into the channel 56. However, the inverse nuts 1' whose protrusions 3 are invisible in FIG. 6 will pass through the branched passageway 54 so as to be discharged from the outlet 55 and recovered into the rotary hopper 11.

The path 53 and 54 defined in the sorting section 22 disposed in the hopper 11 has its top closed, preferably with the cover 58 and the leaf spring 57 in the described embodiment.

It will be understood that the apparatus provided herein is also useful in the position-regulating feed of any articles other than the self-piercing nuts, insofar as those articles have any boss-shaped protrusions on their front or rear faces.

In summary, the present invention improves the efficiency of position regulating and supplying the parts to a downstream apparatus, in a case wherein the parts are dropped in random positions onto a slanted chute within a rotary hopper. In particular, the inclination of the chute can now be increased remarkably, it is possible to utilize the gravitational force to the maximum to raise the feed rate of those parts sliding along said chute, without necessitating any vibrator or other auxiliary device.

What is claimed is:

1. A position regulating parts feeder comprising:

a rotary hopper;

a slanted chute fixed therein;

the hopper having secured to its inner periphery a plurality of lift plates;

the chute being composed of:

an upstream receiving section for catching the parts falling onto the chute;

a middle sorting section for mechanically distinguishing a front face from a rear face of each of the parts so as to separate the parts standing in a regular direction from the other parts standing in an inverse direction; and a downstream discharging section for transferring only the parts standing in the regular direction;

the upstream section having formed therein a longitudinal groove that has a widely open top and is of a depth enough to wholly embrace each of the parts lying on its side such that its front and rear faces confront generally-upright side walls of the groove, wherein the side walls defining the groove has upper oblique zones to widen the groove towards its top so as to smoothly receive the parts;

a path defined in the middle sorting section and continuing from the longitudinal groove; and the path being composed of a main passageway for the regularly positioned parts only and an auxiliary passageway for the inverse parts only, wherein the main passageway extends to the downstream discharging section, and the auxiliary passageway branching off from the main passageway extends to an outlet opening formed in a bottom of the slanted chute.

2. A parts feeder as set forth in claim 1, wherein a main body and a lid secured thereto constitute the slanted chute, and the path defined in the sorting section disposed in the hopper has its top closed with the cover and the leaf spring.

3. A parts feeder as set forth in claim 1 or 2, wherein the parts are self-piercing nuts each having on its front face a pilot protrusion that is formed coaxially with a central threaded bore of the nut.

* * * * *